United States Patent [19]

Nold, III

[11] Patent Number: 4,914,826
[45] Date of Patent: Apr. 10, 1990

[54] DECENTRALIZED WELL LOGGING APPARATUS FOR MEASURING THE DIAMETERS OF A BOREHOLE ALONG ITS PERPENDICULAR DIAMETRICAL AXES

[75] Inventor: Raymond V. Nold, III, Seabrook, Tex.

[73] Assignee: Schlumberger Technology Corporation, Houston, Tex.

[21] Appl. No.: 354,331

[22] Filed: May 19, 1989

[51] Int. Cl.$^4$ .............................................. G01B 3/00
[52] U.S. Cl. .................................... 33/544; 33/544.3
[58] Field of Search .................... 33/544, 544.2, 544.3, 33/555.1, 302

[56] References Cited

U.S. PATENT DOCUMENTS

| | | | |
|---|---|---|---|
| 2,267,110 | 12/1941 | Kinley et al. | 33/544.2 |
| 3,333,466 | 8/1967 | Oliver | 33/544.2 |
| 3,448,373 | 6/1969 | Hahn. | |
| 4,432,143 | 2/1984 | Moriarty et al. | |

Primary Examiner—Harry N. Haroian
Attorney, Agent, or Firm—Henry N. Garrana; Frederic C. Wagret

[57] ABSTRACT

In the preferred embodiment of the well tool disclosed herein, a main body adapted to be suspended in a borehole includes a pivoted tool-decentralizing arm which is movable between a retracted position along the rear of the body and an extended position where the free end of the arm is biased into sliding engagement with a wall of a borehole for urging the forward face of the body into sliding engagement with the opposite borehole wall. A second body is pivotally coupled on the mid-point of the decentralizing arm for maintaining the second body in alignment with the longitudinal axis of the borehole as the free end of the decentralizing arm moves along the borehole wall. Caliper arms are pivotally mounted on each side of the second body for moving in unison between retracted positions and extended positions where the outward ends of the caliper arms are respectively engaged on opposite sides of the borehole. Measuring devices are operatively coupled to the decentralizing arm and the caliper arms for measuring the diameters of the borehole along the respective movement planes of the arms.

42 Claims, 4 Drawing Sheets

DECENTRALIZED WELL LOGGING APPARATUS FOR MEASURING THE DIAMETERS OF A BOREHOLE ALONG ITS PERPENDICULAR DIAMETRICAL AXES

BACKGROUND OF THE INVENTION

Those skilled in the art will, of course, appreciate that a typical well logging measurement involves using a density logging tool to determine what is commonly known as the bulk density of the earth formations traversed by a borehole. Generally these formation bulk density measurements are correlated with other measurements obtained from sonic, resistivity or pulsed neutron logs to calculate formation properties and characteristics of interest. To obtain these bulk density measurements, the body of the logging tool is typically decentralized in the borehole so that one face of the tool is urged into sliding engagement with one side of the borehole. One or more gamma energy detectors in the tool body will then measure the attenuation of gamma energy emitted from a source of gamma energy in the tool body after this energy has passed through a predetermined path in the adjacent earth formations. Standard computational techniques which are well known in the art are then employed to use these attenuation measurements for determining the formation bulk densities of the formations that are being logged.

Heretofore, the typical bulk density logging tool has been provided with a single arm which is pivotally mounted on the rear of the tool body and operatively arranged to be biased outwardly against one wall of the borehole so as to urge the forward face of the tool body into sliding engagement with the opposite wall of the borehole. Typically, this pivoted arm is also coupled to a measuring device so that as the outward end of the arm is moved inwardly and outwardly in accordance with irregularities on the borehole walls, the measuring device will provide a series of output measurements representative of the transverse dimensions of the borehole between the outward end of the arm and the forward face of the tool body.

It will be appreciated, however, that variations in the cross-sectional shape or configuration of a borehole will significantly affect the measurements of the diameter of that borehole. Ideally, a borehole should have a circular cross-sectional shape. In practice, however, boreholes frequently have generally-oval cross-sectional shapes due to wobbling of the drill bit or keyseating by the drill string. Also, it is common for a borehole to have so-called "caves" in the sides of the borehole at different depth intervals in the borehole. Thus, in situations such as these, measurements of the lineal distance between the forward face of the tool body and the outward end of this pivoted arm are not representative of the precise diameter of the borehole along an assumed diametrical axis. Accordingly, in a borehole which has an irregular or non-circular cross-section, it is entirely possible that the logging tool is angularly oriented in such a manner that the transverse distance being measured is a geometrical chord at some depth intervals of the borehole. Thus, heretofore, it has been necessary either to assume that these measurements provided by a pivoted decentralizing arm are sufficiently accurate for a given logging operation or else to rely upon making any critical calipering measurements with a different type of calipering tool.

OBJECTS OF THE INVENTION

Accordingly, it is an object of the present invention to provide a new and improved well tool to measure the diameters of a well bore or borehole along two of its diametrical axes.

It is a further object of the invention to provide new and improved logging apparatus for measuring the diameter of a borehole along separate diametrical axes thereof as the logging apparatus is obtaining measurements representative of one or more formation characteristics.

It is an additional object of the present invention to provide new and improved well logging apparatus arranged to be decentralized in a borehole for maintaining one face of the tool in sliding engagement with one wall of the borehole and accurately measuring the diameters of the borehole along perpendicularly-intersecting diametrical axes.

SUMMARY OF THE INVENTION

These and other objects of the present invention are attained by new and improved well bore apparatus having a main body carrying a tool-decentralizing arm that is movable between a retracted position adjacent to the rearward face of the main body and an extended position where the outward end of the arm is forcibly urged into sliding engagement with one wall of a well bore for urging the forward face of the main body into sliding engagement with the opposite wall of the well bore. A secondary body is pivotally mounted on the midpoint of the decentralizer arm and carries a pair of pivoted caliper arms which move in unison between retracted positions on opposite sides of the secondary body and their respective extended positions where the outward ends of the caliper arms are simultaneously engaged against opposite sides of the well bore. By maintaining the secondary body in coaxial alignment with the central axis of the well bore as the apparatus moves through a well bore, first and second measuring devices which are responsive to the movements of the decentralizer arm and the caliper arms provide first and second output measurements representative of the well bore diameters along diametrical axes lying in the planes of movement of the arms.

BRIEF DESCRIPTION OF THE DRAWINGS

The particular features of the invention are set forth in the appended claims. The arrangement of the invention, together with further objects and various advantages thereof, may best be understood by way of the following description of apparatus incorporating the principles of the invention as depicted in the accompanying drawings, in which:

DETAILED DESCRIPTION OF THE INVENTION

Figure 1:
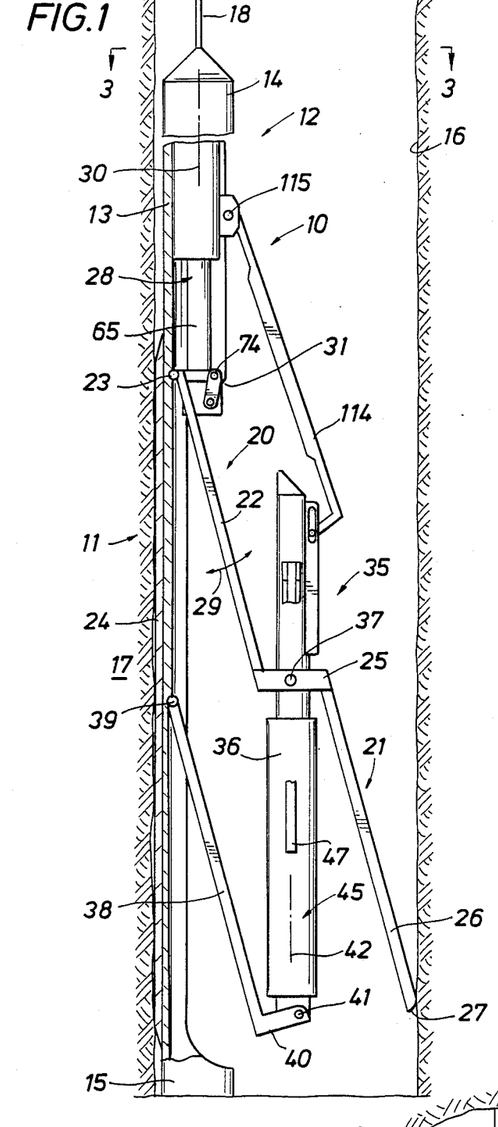
FIG. 1 illustrates one side of a preferred embodiment of apparatus of the present invention as it is being employed in conjunction with a typical logging tool during the course of a logging operation in a borehole.

Turning now to FIG. 1, a preferred embodiment of a new and improved diameter-measuring tool 10 that incorporates the principles of the present invention is seen in combination with one or more typical logging tools, such as a formation-density tool 11, for providing a wireline logging tool 12. The diameter-measuring tool 10 is preferably arranged on an elongated body 13 which is tandemly coupled to one or more other tool bodies, as at 14 and 15, enclosing the downhole measuring and control systems of the diameter-measuring tool and other measuring devices which collectively represent the logging tool 12. Since the present invention is specifically directed to the new and improved diameter-measuring tool 10, it will, of course, be appreciated by those skilled in the art that the invention is wholly independent of the type of measuring devices that may be included in the logging tool 12; and, therefore, a complete understanding of the invention does not require a detailed explanation or a description of the circuitry and particular arrangements of the formation-density tool 11 or other measuring devices or instrumentation that may be enclosed in the various tool bodies 14 and 15.

As will be subsequently explained, the logging tool 12 is shown in FIG. 1 while conducting a logging operation in a borehole 16 penetrating various earth formations, as at 17, to obtain a series of measurements of the borehole diameter as well as a series of typical logging measurements that are representative of the density of those formations. The tool 12 is suspended from a typical logging cable 18 spooled in the usual fashion on a powered winch (not illustrated in the drawings) at the surface of the earth and coupled to typical surface control circuits and instrumentation (neither shown in the drawings) for operating the tool and recording the measurements made by the measuring devices 10 and 11 as a function of the successive depth locations of the logging tool as it is progressively raised in the borehole 16.

As depicted in FIG. 1, the diameter-measuring tool of the invention includes a first diameter-measuring assembly 20 having an elongated main arm or depending tool-decentralizing member 21 which, in the preferred embodiment of the tool 10, is arranged as a bent lever having an elongated upper portion 22 that is pivotally coupled at its upper end to the body 13 by a transverse pivot 23 located immediately behind the wall-engaging forward face 24 of the tool body. In the preferred embodiment of the tool 10, the depending decentralizer arm 21 is arranged with an intermediate laterally-offset or bent portion 25 and an elongated lower portion 26 terminated by a rounded wall-engaging end 27. As will be later described in more detail by reference to FIGS. 4B and 7, the laterally-offset intermediate portion 25 of the decentralizer arm 21 is preferably a bifurcated element having rigid, parallel side members spatially disposed on opposite sides of the body 13.

The elongated decentralizer 21 is operatively coupled to a first selectively-operable actuator 28 in the upper portion of the tool housing 13. As will be subsequently described in more detail, the actuator 28 functions to release the pivoted arm 21 from its normal retracted position inside of the tool body 13 and adjacent to its forward wall-engaging face 24 for pivotal movement in a limited arc of travel, as indicated by the arrow 29, lying in a vertical movement plane including the longitudinal axis 30 of the tool body 13. The actuator 28 thereafter functions by shifting the decentralizer arm 21 rearwardly and on outwardly through a longitudinal opening 31 in the rearward face of the tool body to an extended position where the free end 27 of the decentralizer arm engages the adjacent wall of the borehole 16 with sufficient force for shifting the logging tool 12 laterally in the borehole until the forward face 24 of the tool engages the opposite wall of the borehole. Once the decentralizer arm 21 is extended, it and the forward wall-engaging face 24 of the logging tool 12 will be yieldably maintained in sliding engagement with the opposite borehole walls as the logging tool 12 continues to be raised in the borehole 16.

In this manner, as the logging tool 12 is being raised in the borehole 16, the selectively-operable actuator 28 maintains the forward face 24 of the tool body 13 and the wall-engaging end 27 of the extended decentralizer arm 21 firmly but slidably engaged against the opposite walls of the borehole. This will, of course, allow the decentralizer arm 21 to be proportionally shifted inwardly and outwardly in its movement plane as its rounded end 27 successively encounters and moves over surface irregularities on the borehole wall representing a measurable variations in the diameter of the borehole 16 along that diametrical measuring axis of the tool 10. As will be subsequently described in greater detail, the first diameter-measuring assembly 20 further includes means such as a typical analog or digital measuring device (neither of which are shown in FIG. 1) which is operable in response to the successive movements or the angular positions of the pivoted decentralizer arm 21 in relation to the body 13 for providing output measurements representative of the borehole diameter along the movement plane of the pivoted arm. These first output measurements are transmitted to the surface by way of the suspension cable 18 and recorded as a function of the successive depth locations of the logging tool 12 as it is being progressively elevated in the borehole 16.

Figure 4A:
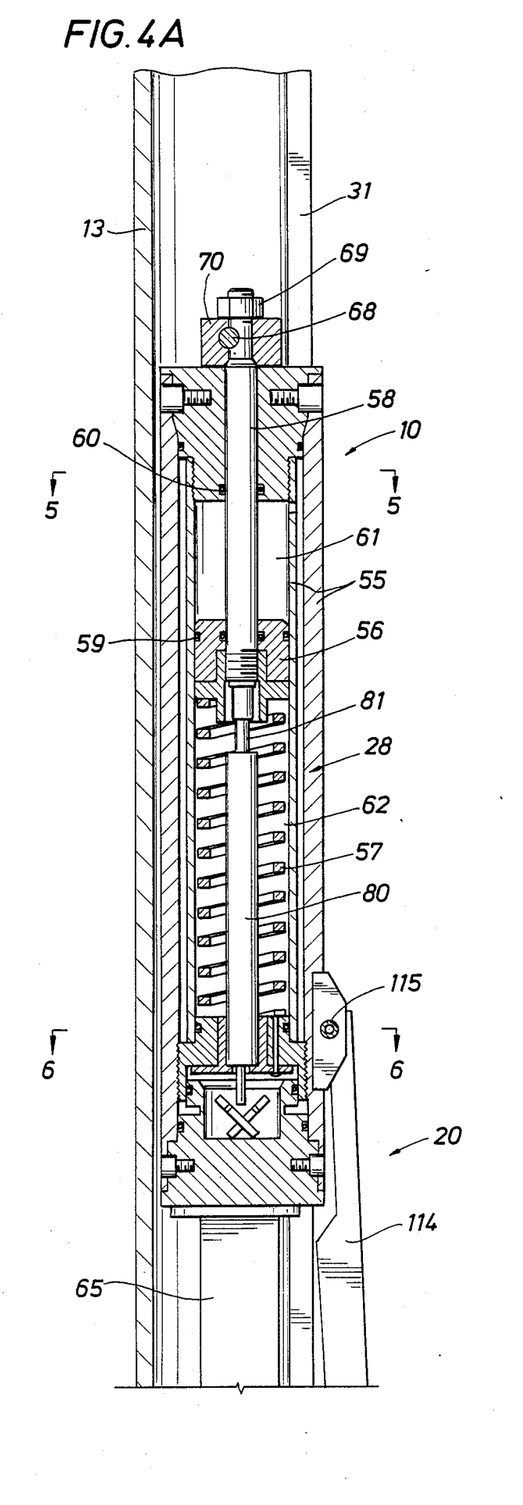
FIGS. 4A-4C are successive elevational views showing a preferred embodiment of the diameter-measuring apparatus of the present invention.
Figure 4B:
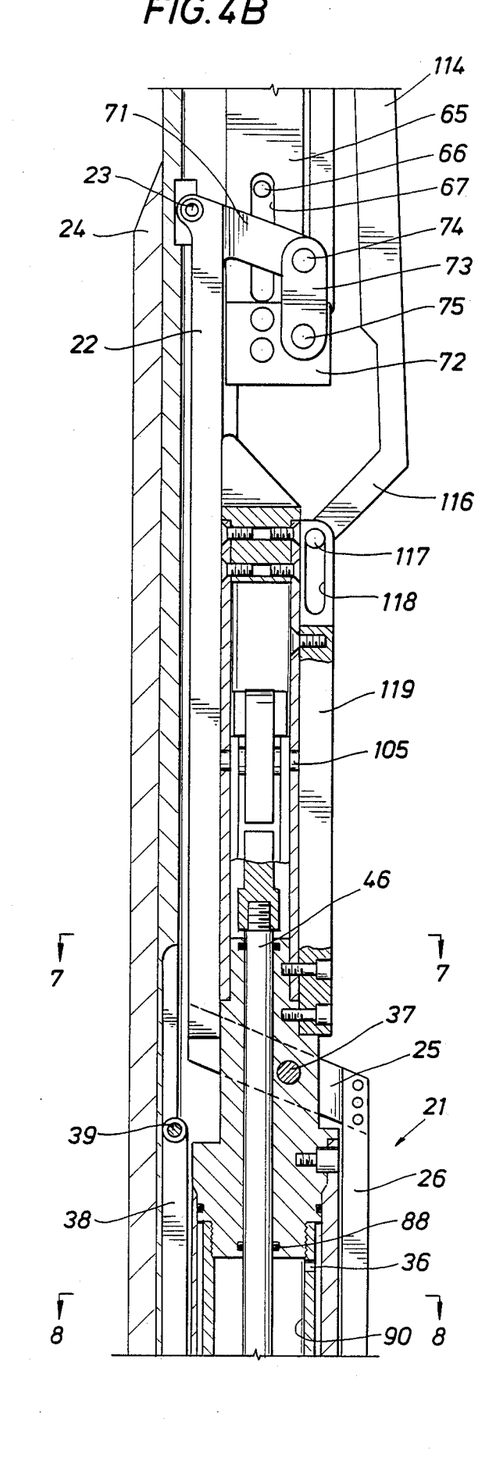
Figure 7:
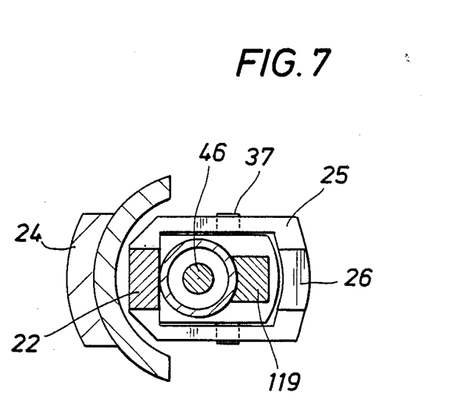
Figure 8:
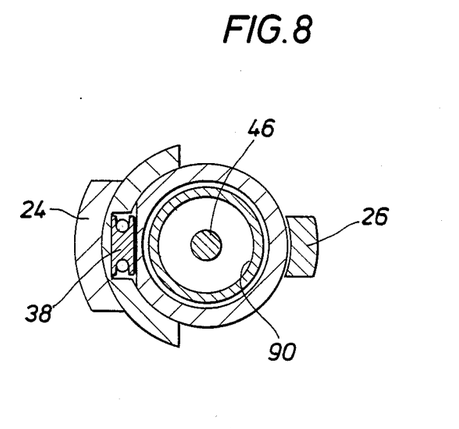

As depicted in FIG. 1, the diameter-measuring tool 10 of the invention further includes a second diameter-measuring assembly 35 arranged in a short fluid-tight housing 36 which is maintained in a upright position and, as illustrated in FIGS. 4B and 7, rotatably journalled by a transverse pivot 37 to the bifurcated, laterally-offset mid-portion 25 of the decentralizer arm 21. In the new and improved measuring tool 10, the fluid-tight housing 36 and the offset mid-portion 25 of the decentralizer arm 21 are cooperatively arranged and sized so that when the arm is in its retracted position, its elongated upper portion 22 will be just behind the forward wall-engaging face of the body 13 and the housing 36 will be at least substantially accommodated within the tool body 13.

It will, of course, be realized that since the fluid-tight housing 36 is rotatably journalled on the pivoted arm 21, the movements of the pivoted arm between its retracted and extended positions will simultaneously carry the fluid-tight housing in an upright position back and forth between its retracted position within the tool body 13 and, as shown in FIG. 1, a laterally-extended position where the fluid-tight housing is stationed midway between the forward face 24 of the tool body and the wall of the borehole 16. Moreover, it will be appreciated that as the pivoted decentralizer 21 successively pivots inwardly and outwardly when its outer end 27 encounters and moves over irregularities on the borehole wall, by virtue of its pivotal coupling 37, the fluid-tight housing 36 will be correspondingly shifted laterally back and forth in relation to the tool body 13. Accordingly, as the logging tool 12 is moving along the borehole 16, the pivotal movements of the decentralizer arm 21 cooperate to maintain the fluid-tight housing 36 precisely centered in the borehole 16 regardless of any variations in the borehole diameter in the plane of movement of the decentralizer arm.

It should be particularly noted that, in keeping with the objects of the present invention, it is essential that the transverse journal 37 carrying the fluid-tight housing 36 is precisely located midway between the arm pivot 23 and the wall-engaging end 27 of the pivoted arm 21. In this manner, the back-and-forth movements of the pivoted decentralizer arm 21 in response to irregularities on the borehole walls will be effective for continuously positioning the fluid-tight housing 36 midway between the opposite walls of the borehole 16. Thus, by virtue of this unique arrangement and the precise dimensional relationships of the second diameter-measuring assembly 35, the central axis 40 of the housing 36 will always be precisely positioned along the borehole axis included in the plane of movement of the pivoted arm 21.

The second diameter-measuring assembly 35 preferably includes an elongated arm 38 which, as shown in FIG. 1, is pivoted at its upper end by a fixed transverse pivot 39 on the rear of the forward wall-engaging surface 24 of the tool body 13 and directly below the fixed upper pivot 23. The lower end of the elongated arm 38 is turned outwardly, as at 40, so as to project under the lower end of the fluid-tight housing 36 where it is pivotally coupled to the the housing by a transverse pivot or journal, as at 41, located directly below the upper journal 37 and aligned therewith along the central housing axis 41. In this manner, as shown in FIG. 1, it will be appreciated that the four pivots 23, 37, 39 and 41 respectively define the four corners of a parallelogram mechanism which functions to retain the fluid-tight housing 36 in an upright position with its central axis 42 always being parallel with the longitudinal axis 30 of the diameter-measuring tool 10 at all positions of the decentralizer arm 21. It should, however, be appreciated by those skilled in the art that even though this second pivoted arm 38 is not a critical element of the second diameter-measuring assembly 35, the second pivoted arm functions to keep the fluid-tight housing 36 in an upright position regardless of any borehole obstructions that might otherwise tilt the housing. This second pivoted arm 38 also strengthens the pivotal coupling between the second diameter-measuring assembly 35 and the tool body 13. It will, of course, be appreciated that the first and second pivoted arms 21 and 38 will also cooperate to stabilize the fluid-tight housing 36 against sideways movement and, thereby, prevent the second diameter-measuring assembly 35 from being damaged as the tool 10 is operating.

Figure 2:
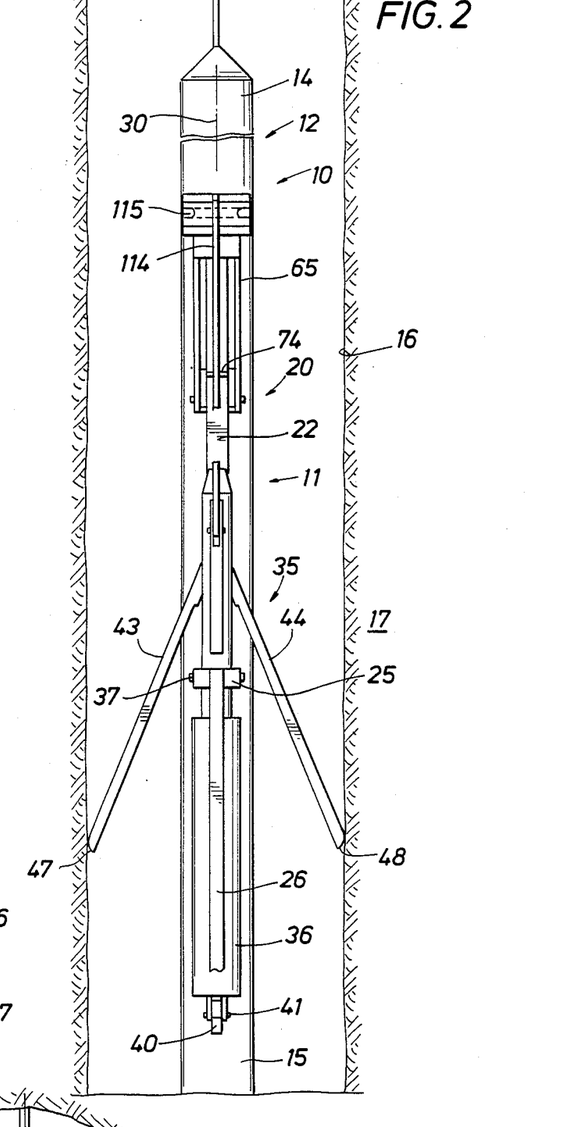
FIG. 2 is similar to FIG. 1 but instead depicts the back of the apparatus for portraying another aspect of the present invention.

As previously discussed, the unique pivotal suspension of the fluid-tight housing 36 from its pivot 37 in the mid-portion 25 of the decentralizer arm 21 will insure that the housing will always be positioned midway between the opposite walls of the borehole 16 respectively engaged by the forward wall-engaging surface 24 of the tool body 13 and the free end portion 27 of the decentralizer. Accordingly, as best seen in FIG. 2, as a major aspect of the invention, the diameter measuring assembly 35 further includes a pair of calipering arms 43 and 44 that are cooperatively arranged on the housing 36 for simultaneous pivotal movement in opposite directions along a common plane of movement intersecting the plane of movement of the arm 21. The second assembly 35 also includes a second actuator 45 that is preferably arranged in the lower portion of the fluid-tight housing 36. As will be described subsequently, the second actuator 45 functions in a similar fashion as the first actuator 28, with this second actuator arranged to selectively release a central operating rod 46 (not seen in FIG. 2) cooperatively arranged in the upper portion of the secondary housing 36 for upward and downward movement relative to the secondary housing.

Once the operating rod 46 is released, the actuator 45 functions by simultaneously shifting the pivoted calipering arms 43 and 44 outwardly from the secondary body 36 to the extended positions shown in FIG. 2 where their respective lower ends, as at 47 and 48, will be yieldably maintained in sliding engagement against the opposing sides of the borehole 16 for providing a linear measurement representative of the borehole diameter lying in the common movement plane of the calipering arms. The second diameter-measuring assembly 35 further includes second measuring means such as a typical analog or digital measuring device (not shown in FIG. 2) responsive to the successive movements or relative angular positions of the calipering arms 43 and 44 for providing a series of second output measurements which are representative of the diameter of the borehole 16 along the diametrical axis including the common movement plane of those two pivoted arms. These second output measurements are transmitted to the surface by way of the suspension cable 18 and recorded as a function of the successive depth locations of the logging tool 12 as it is progressively elevated in the borehole 16.

Figure 3:
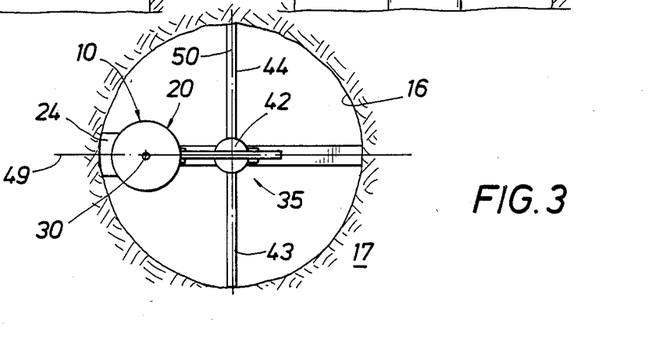
FIG. 3 is a cross-sectional plan view of the borehole and the logging apparatus taken along the Lines 3—3 in FIG. 1 to show the individual measuring axes of the apparatus.

Accordingly, by comparing FIGS. 1, 2 and 3, it will be seen that as the logging tool 12 is operated in the borehole 16, the first diameter-measuring assembly 20 is selectively operable to shift the decentralizer arm 21 rearwardly from the body 13 with sufficient force to retain the forward face 24 of the tool body and the free end 27 of the decentralizer arm in sliding engagement with the opposite borehole walls. At the same time, upon extension of the arm 21, the diameter-measuring assembly 35 precisely centers the secondary housing 36 between the opposite borehole walls and urges the pivoted calipering arms 43 and 44 into sliding engagement with the opposite sides of the borehole 16. Thus, as the logging tool 12 is being elevated in the borehole 16, the decentralizer arm 21 will be correspondingly positioned as the diameter-measuring assembly 20 encounters measurable variations in the borehole diameter in the first measuring axis 49 of the tool 10. At the same time, the second diameter-measuring assembly 35 similarly responds to the movements or relative angular positions of the calipering arms 43 and 44 occurring as their ends 47 and 48 encounter measurable diametrical variations in the second measuring axis 50 of the tool 10. Accordingly, when measurable diametrical variations are encountered along either of the two measuring axes 49 and 50 of the diameter-measuring tool 10, the first and second diameter-measuring assemblies respectively function to provide first and second output signals representative of these anomalies which are transmitted by way of the suspension cable 18 to surface instrumentation (not illustrated in the drawings).

Figure 4C:
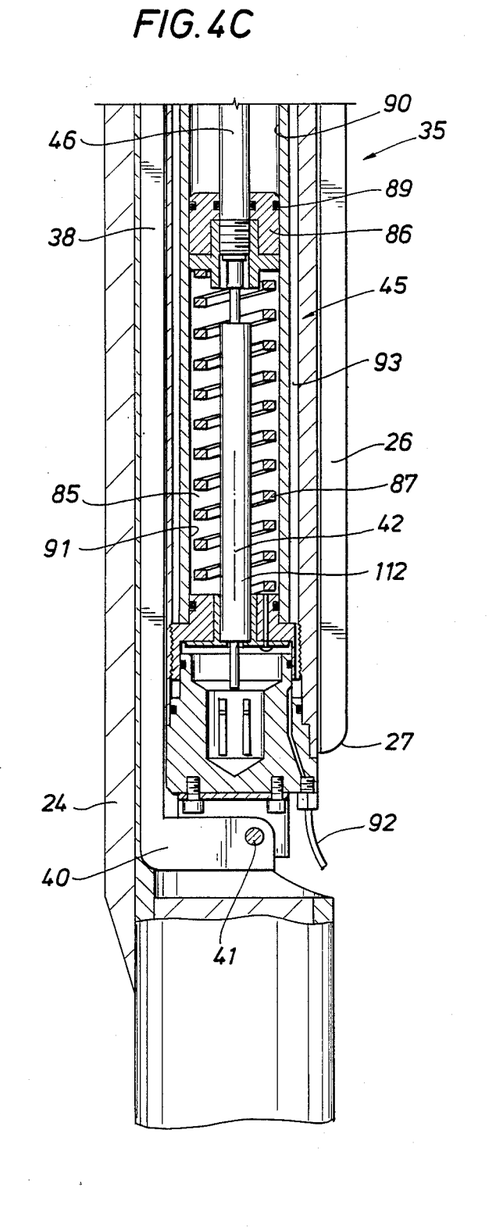

Turning now to FIGS. 4A-4C, successive elevational views are shown of one side of a preferred embodiment of the diameter-measuring tool 10 of the present invention, with the body 13 being partially cut away in each of these views for better illustrating various components of the two diameter-measuring assemblies 20 and 35 of the new and improved tool 10 of the present invention. FIGS. 5-8 are transverse cross-sectional views which are respectively taken along the Lines 5—5, 6—6, 7—7 and 8—8 for purposes of supplementing the descriptions of FIGS. 4A-C. As shown in FIG. 4A, the actuator 28 includes a double-wall housing 55 having an upper portion enclosing a piston 56 and a lower portion carrying a stout spring 57 that is arranged for cooperatively biasing a central operating rod 58 upwardly in relation to the actuator housing. As is typical for hydraulically-operated well tools having selectively extendible members, the new and improved tool 10 further includes fluid-actuating means (such as a typical hydraulic generator located, for example, in the tool housing 14) for selectively supplying a pressured fluid to the upper portion of the housing 55 above the piston 56 when it is desired to retain the decentralizer 21 in its depicted retracted position and for selectively allowing this fluid to be displaced from the actuator by the biasing action of the spring 57 on the piston 56 when the decentralizer arm is to be extended against the adjacent borehole wall.

As illustrated in FIG. 4A, the selectively-operable actuator 28 is cooperatively arranged with the piston 56 on the lower end of the central operating rod 58. O-rings 59 and 60 are cooperatively arranged between the inner wall of the housing 55 and the piston 56 and the central operating rod 58 respectively for defining a sealed fluid chamber 61 in the upper portion of the housing above the piston. It will, of course, be recognized that so long as the fluid chamber 61 is filled with a suitable hydraulic fluid, the operating rod 58 is prevented from moving upwardly from its depicted lower operating position. Accordingly, the biasing spring 57 for the actuator 28 is preferably a stout coil spring which is operatively compressed within a lower chamber 62 defined in the inner wall of the housing 55 between its lower end and the lower face of the piston 56 for urging the operating rod 58 upwardly with substantial force when the hydraulic fluid is displaced from the upper fluid chamber 61.

Once the hydraulic fluid is displaced from the sealed fluid chamber 61, the biasing spring 57 initially functions to swing the decentralizer arm 21 upwardly and outwardly into engagement with the adjacent borehole wall with sufficient force that the logging tool 12 is shifted laterally in the borehole 16 until the wall-engaging face 24 of the tool moves into engagement with the opposite borehole wall. Thereafter, as previously described by reference to FIG. 1, as the new and improved diameter-measuring tool 10 is being raised in the borehole 16, the spring 57 will retain the decentralizer 21 and the forward face 24 slidably engaged with the opposite borehole walls while the pivoted decentralizer moves inwardly and outwardly in its transverse movement plane in response to diametrical variations along the first diameter-measuring axis 49. The decentralizer arm 21 is, of course, selectively retracted by again delivering hydraulic fluid into the upper fluid chamber 61 with sufficient pressure for returning the actuator piston 56 to its lower operating position as the spring 57 is again fully compressed in the lower chamber 62.

Figure 5:
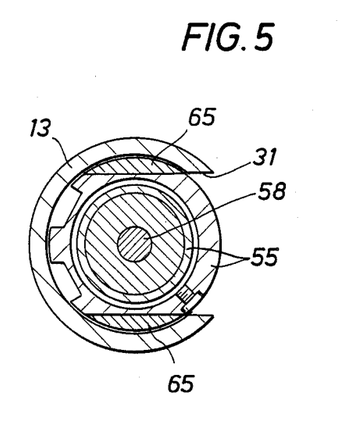
FIGS. 5-8 are transverse cross-sectional views which are respectively taken along the Lines 5—5 and 6—6 in FIG. 4A and the Lines 7—7 and 8—8 in FIG. 4B.
Figure 6:
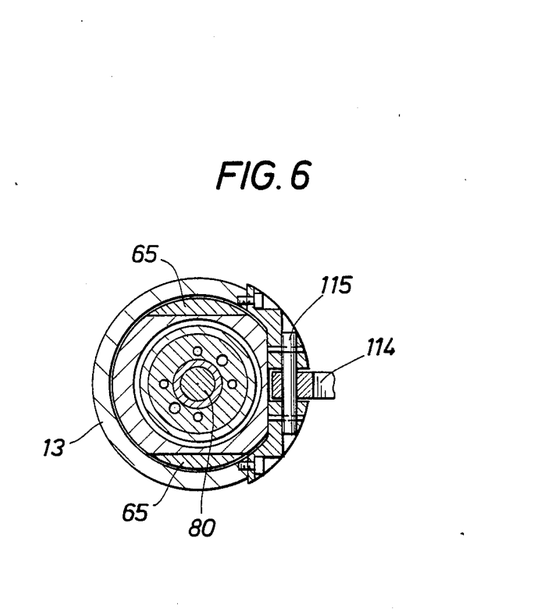

To transfer the upward and downward movements of the central operating rod 58 to the pivoted decentralizer arm 21, the first diameter-measuring assembly 20 further includes force-transferring means such as a pair of paralleled rigid elongated bars, as at 65, which are slidably mounted on the opposite internal side walls of the tool housing 13 and, as shown in FIG. 5 and 6, respectively straddle the actuator housing 55. As shown in FIG. 4B, inwardly-projecting guide pins 66 are mounted on the inner walls of the tool body 13 with their free ends disposed in elongated longitudinal slots 67 in the paralleled bars 65 which are of sufficient length and arranged to allow the bars to move freely between their upper and lower operating positions in the tool body.

As illustrated in FIG. 4A, a link pin 68 is mounted in a transverse position through the upper end of the operating rod 58 with the opposite ends of the pin being cooperatively fitted in mating holes in the upper ends of the paralleled bars 65 for transferring the upward and downward movements of the operating rod to those bars. To adjust the longitudinal position of the operating rod 58 in relation to the housing 55, means are provided such as an adjustment nut 69 that is threadedly coupled to the upper end of the rod and supported on the upper face of an annular stop member 70 resting on the upper end of the actuator housing.

To couple the decentralizer arm 21 to the operating rod 58 and the paralleled bars 65, the force-transferring means of the first diameter-measuring assembly 20 further include a rearwardly-projecting actuator 71 which, as shown in FIG. 4B, is an integral part of the elongated upper portion 22 of the decentralizer that extends beyond the fixed pivot 23 and has its free outer end positioned between the lower ends of the paralleled bars. Rearwardly-projecting extensions, as at 72, are arranged on the lower end of each paralleled bar 65 to be positioned at a lower elevation than the outer end of the actuator arm 71. The decentralizer 21 and the parallel bars 65 are operatively coupled to one another by means such as paralleled rigid links 73 respectively carrying transverse pivots 74 and 75 on their upper and lower ends that are, in turn, respectively coupled to the actuator arm 71 and the two rearwardly-projecting extension 72. It should be realized, therefore, that these rigid bars 65 and the rigid links 73 cooperate to transfer the axial forces provided by the first actuator 28 to the actuator arm 71 of the decentralizer 21 as required for extending or retracting the decentralizer. On the other hand, it will be also appreciated that the rigid paralleled bars 65 and the rigid links 73 further cooperate by translating the inward and outward swinging movements of the decentralizer 21 into proportional vertical movements of the central operating rod 58 which are fully representative of the lateral positions of the rounded lower end 27 of the decentralizer in relation to the tool body 13.

As previously mentioned, the first diameter-measuring assembly 20 includes a digital or an analog measuring device such as a typical linear potentiometer 80 which, as shown in FIG. 4A, is cooperatively arranged in the housing 54 for producing measurements representative of the movements of the decentralizer 21. In the illustrated preferred embodiment of the first diameter-measuring assembly 20, the potentiometer 80 is arranged in the lower fluid chamber 62 with its base secured to the lower end of the actuator housing 54 and its slidable actuator 81 coupled to the underside of the actuator piston 56. In this manner, as the central operating rod 58 is moved upwardly and downwardly in response to the outward and inward movements of the decentralizer 21 from measurable changes in the borehole diameters in the first measuring axis 48, the potentiometer 80 will be proportionally adjusted for producing output signals representative of these diametrical changes as well as the precise lateral positions of the lower end 27 of the decentralizer.

As illustrated in FIG. 4C, the second actuator 45 is cooperatively arranged to define an enclosed chamber 85 in the secondary housing 36 in which the central operating rod 46 is coaxially disposed. An actuating piston 86 is arranged on the lower end of the operating rod 46 and disposed in the enclosed chamber 85 on top of a stout biasing spring 87. O-rings 88 and 89 are cooperatively arranged between the upper end of the fluid-tight housing 36 and the central operating rod 46 and the piston 86 respectively for defining a sealed fluid chamber 90 in the upper portion of the housing above the piston 86. It will, of course, be appreciated that so long as the fluid chamber 90 remains filled with a hydraulic fluid, the operating rod 46 is prevented from moving upwardly from its depicted lower operating position. Accordingly, the biasing spring 87 for the second actuator 45 is preferably a stout coil spring which is operatively compressed within a lower fluid chamber 91 defined between the lower end wall of the housing 36 and the lower face of the piston 86 for urging the operating rod 46 upwardly with substantial force when the hydraulic fluid is displaced from the upper fluid chamber 90.

Once the hydraulic fluid is displaced from the chamber 90, the biasing spring 87 will initially function by swinging the calipering arms 43 and 44 upwardly and outwardly to place their respective ends 47 and 48 into sliding engagement with the borehole wall. Thereafter, as previously described by reference to FIG. 2, as the measuring tool 10 is being raised in the borehole 16, the stout spring 87 will retain the lower ends 47 and 48 of the calipering arms 43 and 44 engaged with the opposite sides of the borehole 16 while the calipering arms independently move inwardly and outwardly in a common movement plane in response to diametrical variations along the second diameter-measuring axis 50. The calipering arms 43 and 44 are, of course, selectively retracted when fluid is admitted bach into the upper fluid chamber 90 with sufficient pressure for returning the actuator piston 86 to its lower operating position as the spring 87 is again fully compressed in the lower chamber 91. Since the body 36 is movable from its retracted position within the housing 13 to its extended position where it is centered between the opposed borehole walls, the selectively-operable hydraulic generator in the housing 14 is preferably communicated with the upper fluid chamber 90 in a typical fashion such as by a flexible hydraulic conduit 92 and fluid passages, as at 93, arranged in the wall of the secondary body 36.

Figure 9:
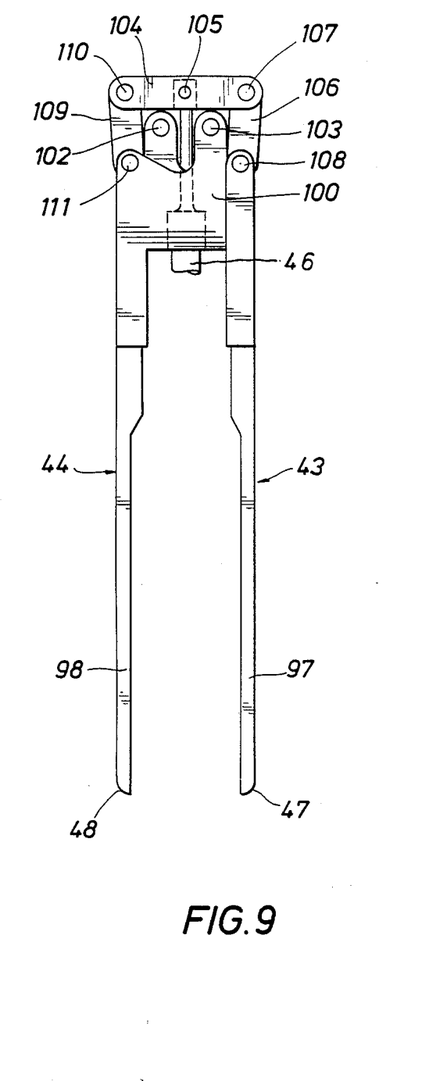
FIG. 9 is an elevational view showing details of one portion of the new and improved apparatus of the invention.

To transfer the upward and downward movements of the central operating rod 46 to the pivoted calipering arms 43 and 44, the second diameter-measuring assembly 35 further includes force-transferring means cooperatively arranged for pivoting the calipering arms 43 and 44 outwardly in unison from opposite sides of the fluid-tight housing 36 in a plane of movement that is perpendicular to the vertical plane of movement of the decentralizer arm 21. As illustrated in FIG. 9, in the preferred embodiment of the second diameter-measuring assembly 35, the calipering arms 43 and 44 include elongated depending arm portions 97 and 98 normally lying in a generally-vertical position alongside the opposite sides of the fluid-tight housing 36 when the calipering arms are in their respective retracted positions. The wall-engaging ends 47 and 48 are suitably formed on the lower ends of these arm portions 97 and 98. The upper ends of the calipering arms 43 and 44 are respectively shaped for defining short, inwardly-turned bent portions 99 and 100 that are respectively pivoted to an upper extension 101 of the fluid-tight housing 36 by fixed pivots 102 and 103.

The force-transferring means of the second actuator 45 further includes a transverse bar or rocker arm 104 having its mid-point pivotally coupled, as at 105, to the upper end of the central operating rod 46. One end of the rocker arm 104 is, in turn, pivotally coupled to the bent actuating arm 99 by a short rigid link 106 carrying pivots 107 and 108 at its upper and lower ends. In a similar fashion, the opposite end of the rocker arm 104 is pivotally coupled to the bent actuating arm 100 by a second rigid link 109 which has pivots 110 and 111 respectively arranged at the upper and lower ends of the link.

It should be appreciated, therefore, that the rocker arm 104 and its associated rigid links 106 and 108 respectively function to transfer the axial forces provided by the second actuator 45 to the upper actuating arms 99 and 100 of the pivoted arms 43 and 44 to selectively extend or retract the calipering arms. Conversely, the rocker arm 104 and the rigid links 106 and 109 also function for translating inward and outward pivotal movements of the calipering arms 43 and 44 into proportional vertical travel of the central operating rod 46 of the second actuator 45 indicative of the linear distance between the lower ends 47 and 48 of the two arms. Accordingly, as previously mentioned, the second diameter-measuring assembly 35 includes a digital or analog measuring device, such as a typical linear potentiometer 112, that is operatively arranged in the secondary body 36 for producing measurements representative of the movements or positions of the calipering arms 43 and 44. In the preferred embodiment of the diameter-measuring assembly 35, the potentiometer 112 is arranged in the lower fluid chamber 91 with its base secured to the lower end of the secondary housing 36 and its slidable actuator 113 coupled to the underside of the piston 86. In this manner, as the central operating rod 46 is moved in response to the inward and outward movements of the two caliper arms 43 and 44 from changes in the borehole diameters in the second measuring axis 50, the corresponding movements of the actuator 113 on the potentiometer 112 will produce output signals representative of these diametrical changes.

Those skilled in the art will, of course, recognize that even the best-designed well tools will occasionally fail to operate as intended. Accordingly, referring to FIGS. 4A, 4B and 6, a "fail-safe" device for the diameter-measuring tool 10 is depicted as including an elongated arm 114 which is dependently coupled to the housing 55 by a fixed pivot 115 located on the rearward face of the housing above the upper end of the extension 101 of the secondary body 36. The lower end of the elongated arm 114 is turned inwardly or bent, as at 116, and is slidably coupled to the uppermost end of the secondary housing 36 by means such as a transverse pin 117 that is loosely disposed in elongated longitudinal slots 118 formed in the opposite side walls of a rearwardly-opening channel 119 mounted along the rear of the extension 101.

Although this elongated arm 114 in not involved in the ordinary operation of the diameter-measuring tool 10 of the present invention, it will be recognized that should there be a failure of the hydraulic system of the well tool 10, the decentralizer arm 21 and the secondary housing 36 will be left in their respective extended positions. Thus, if the decentralizer 21 and the secondary housing 36 are extended when the measuring tool 10 is raised into the lower end of a typical surface casing in a well bore, the tool can be easily damaged or even lost unless the force of the biasing spring 57 in the first actuator 28 can be overcome. Accordingly, when the upper edge of the elongated arm 114 engages the lower end of the surface casing, the elongated arm will be moved inwardly and downwardly and thereby push the upper end of the upright extension 101 into the longitudinal opening 31 along the rearward face of the tool body 13. This will, as a minimum, keep the secondary body 36 from being torn off of the tool body 13. Once the upper extension 101 is moved into the housing 13, the decentralizer arm 21 and the calipering arms 43 and 44 will most likely be similarly moved toward their respective retracted positions as their upper edges contact the lower end of the surface casing.

Accordingly, it will be appreciated that the new and improved diameter-measuring tool 10 of the present invention provides a tool which is capable of accurately measuring the diameters of a well bore along intersecting diametrical axes while is eccentrically positioned in a well bore such as an uncased borehole. The new and improved tool 10 includes a first diameter-measuring assembly 20 which provides a series of first output measurements representative of the diameter of a well bore lying along the movement plane of an elongated decentralizer arm 21 pivotally arranged on the rearward face of the tool body and selectively extendible to an extended position to contact one wall of the well bore with sufficient force for moving the tool laterally in the well bore to place the forward face of the tool body in sliding engagement with the opposite wall of the well bore.

The new and improved tool 10 further includes a second diameter-measuring assembly 35 which is uniquely supported from a pivot near the mid-point of the decentralizer arm 21 to precisely center the second assembly in the well bore between the opposite walls of the well bore. Calipering arms 43 and 44 are arranged on the sides of the secondary body 36 of the measuring assembly 35 and cooperatively arranged for moving outwardly therefrom along a common plane of movement intersecting the movement plane of the decentralizing arm 21 and slidably engaging the opposite sides of the well bore. The new and improved measuring tool 10 further includes first and second measuring devices respectively responsive to the operating positions of the extendible decentralizer arm 21 and the calipering arms 43 and 44 for providing accurate measurements of the well bore diameters along intersecting measuring axes.

While only a particular embodiment of the apparatus of the present invention has been shown and described herein, it is apparent that various changes and modifications may be made to the described apparatus without departing from the broader aspects of this invention; and, therefore, the aim in the appended claims is to cover all changes and modifications that fall within the true spirit and scope of this invention.

What is claimed is:

1. A well tool for passage along a well bore and including:
   a tool body for suspension from a cable in a well bore;
   means for decentralizing said tool body including a decentralizer on said tool body and movable to an extended position for engaging said decentralizer and tool body with a first set of well bore surfaces on opposite sides of that well bore;
   first measurement means operable on engagement of said tool body and decentralizer with said first set of well bore surfaces for measuring the spacing therebetween;
   first and second caliper arms coupled to opposite sides of said decentralizer and outwardly movable therefrom for engaging said caliper arms with a second set of well bore surfaces on opposite sides of that well bore; and
   second measurement means operable on engagement of said caliper arms with said second set of well bore surfaces for measuring the spacing therebetween.

2. The well tool of claim 1 wherein said first set of well bore surfaces are aligned along a first transverse well bore axis so that said first measurement means measure the well bore diameter along said first axis.

3. The well tool of claim 1 wherein said second well bore surfaces are aligned along a second transverse well bore axis so that said second measurement means measure the well bore diameter along said second axis.

4. The well tool of claim 1 wherein said first and second sets of well bore surfaces are respectively aligned along first and second intersecting transverse well bore axes so that said first and second measurement means measure the well bore diameters in a common transverse plane including said first and second axes.

5. The well tool of claim 1 wherein said first and second sets of well bore surfaces are respectively aligned along first and second perpendicularly intersecting transverse well bore axes so that said first and second measurement means measure the well bore diameters lying at right angles in a common transverse plane including said first and second axes.

6. A well tool for travel along a well bore and including:
   a tool body for suspension from a cable in a well bore;
   means for decentralizing said tool body in a well bore including a decentralizer arranged on said tool body for movement to an extended position where said decentralizer engages one well bore surface and shifts said tool body into engagement with the opposite well bore surface;
   first measurement means operable on engagement of said tool body and said decentralizer with first opposed well bore surfaces for measuring the lineal distance therebetween;
   first and second caliper arms coupled to opposite sides of said decentralizer and outwardly movable therefrom upon movement of said decentralizer to its said extended position for engaging the outer ends of said caliper arms with second opposed well bore surfaces; and
   second measurement means operable on engagement of said caliper arms with said second opposed well bore surfaces for measuring the lineal distance therebetween.

7. The well tool of claim 6 wherein said decentralizer moves in a plane of movement including the longitudinal well bore axis so that the lineal distance measured by said first measurement means is the well bore diameter lying along said plane of movement of said decentralizer.

8. The well tool of claim 6 wherein said caliper arms move in a plane of movement including the longitudinal well bore axis so that the lineal distance measured by said second measurement means is the well bore diameter lying along said plane of movement of said caliper arms.

9. The well tool of claim 6 wherein said decentralizer and said caliper arms respectively move along first and second planes of movement including the longitudinal well bore axis so that the lineal distances that are respectively measured by said first and second measurement means are the well bore diameters lying along each of said planes of movement.

10. The well tool of claim 9 wherein said first and second planes of movement perpendicularly intersect one another.

11. The well tool of claim 6 further including:
means pivotally coupling said decentralizer to said tool body for swinging outwardly therefrom in a plane of movement including the longitudinal well bore axis so that said first measurement means measure the well bore diameter in said plane of movement.

12. The well tool of claim 11 further including:
means pivotally coupling said caliper arms on opposite sides of said decentralizer for swinging outwardly in a common plane of movement including said longitudinal well bore axis so that said second measurement means measure the well bore diameter in said common plane of movement.

13. The well tool of claim 12 wherein said respective planes of movement perpendicularly intersect one another to position said measured well bore diameters at right angles in relation to one another.

14. The well tool of claim 6 further including:
first biasing means for maintaining said tool body and said decentralizer engaged with said first opposed well bore surfaces upon travel of said tool body in a well bore so that said first measurement means successively measure the lineal distances between said first opposed well bore surfaces as said tool body travels along a well bore.

15. The well tool of claim 14 further including:
second biasing means for maintaining said caliper arms engaged with said second opposed well bore surfaces upon travel of said tool body in a well bore so that said second measurement means successively measure the lineal distances between said second opposed well bore surfaces as said tool body travels along a well bore.

16. The well tool of claim 15 further including:
first and second actuators operable for selectively engaging said decentralizer and said caliper arms with said first and second opposed well bore surfaces when said tool body is at one depth interval in a well bore and selectively disengaging said decentralizer when said tool body is at a different depth interval in a well bore.

17. A well tool for travel along a well bore and including: a first body for suspension from a cable in a well bore;
means for decentralizing said first body in a well bore including an arm arranged on said first body for movement between a retracted position adjacent to one side thereof and an extended position where said movable arm is engaging one well bore surface for shifting the opposite side of said first body laterally against the opposite well bore surface;
first measuring means operable whenever said first body and said movable arm are respectively engaged with first opposed well bore surfaces for measuring the lineal distance therebetween;
a second body;
means for coupling said second body to an intermediate portion of said arm to position said second body between said first opposed well bore surfaces upon engagement of said first body and said movable arm therewith;
first and second caliper arms on opposite sides of said second body and movable outwardly therefrom for engaging the outer ends of said caliper arms with second opposed well bore surfaces between said first opposed well bore surfaces; and
second measuring means operable whenever said caliper arms are respectively engaged with said second opposed well bore surfaces for measuring the lineal distance therebetween.

18. The well tool of claim 17 further including:
first biasing means on said first body for maintaining said first body and said movable arm engaged with said first opposed well bore surfaces upon travel of said first body between spaced depth intervals in a well bore so that said first measurement means successively measure the lineal distances between said first opposed well bore surfaces at those depth intervals.

19. The well tool of claim 17 further including:
second biasing means on said second body for maintaining said caliper arms engaged with said second opposed well bore surfaces upon travel of said well tool between spaced depth intervals in a well bore so that said second measurement means successively measure the lineal distances between said second opposed well bore surfaces at those depth intervals.

20. The well tool of claim 19 further including:
first and second actuators operable for selectively disengaging said decentralizer and said caliper arms from said first and second opposed well bore surfaces.

21. The well tool of claim 17 wherein said movable arm moves along a plane of movement including the longitudinal well bore axis so that the lineal distance measured by said first means is the well bore diameter lying along said plane of movement of said movable arm.

22. The well tool of claim 17 wherein said caliper arms move along a plane of movement including the longitudinal well bore axis so that the lineal distance measured by said second means is the well bore diameter lying along said plane of movement of said caliper arms.

23. The well tool of claim 17 wherein said movable arm and said caliper arms respectively move along first and second planes of movement including the longitudinal well bore axis so that the lineal distances that are measured by said first and second means are the well bore diameters lying along each of said planes of movement.

24. The well tool of claim 23 wherein said first and second planes of movement perpendicularly intersect one another.

25. The well tool of claim 17 further including:
means pivotally coupling said movable arm on said first body for swinging outwardly in a plane of movement including the longitudinal well bore axis so that said first means will measure the well bore diameter lying in said plane of movement.

26. The well tool of claim 25 wherein said means for coupling said second body to an intermediate portion of said movable arm position said second body exactly in coincidental alignment with the longitudinal well bore axis and further including means pivotally coupling said caliper arms on said second body for swinging outwardly in a common plane of movement including said longitudinal well bore axis so that said second means will measure the well bore diameter lying in said common plane of movement.

27. The well tool of claim 26 wherein said respective planes of movement perpendicularly intersect one another whereby said measured well bore diameters are positioned at right angles in relation to one another.

28. A well tool for passage along a well bore and including: a first body for suspension from a cable in a well bore;
means for decentralizing said first body in a well bore including an elongated decentralizer arm operatively arranged on said first body for movement between a retracted position adjacent to one side of said first body and an extended position where the outward end of said elongated arm engages one well bore surface for shifting the opposite side of said first body laterally against the opposite well bore surface;
first actuating means arranged on said first body for selectively moving said elongated arm back and forth between its two said positions and including biasing means urging said outward end of said elongated arm against an adjacent well bore surface with sufficient force to shift said first body laterally in a well bore and maintain said opposite side of said first body slidably engaged with the opposite well bore surface, and a piston actuator operable for releasing said elongated arm to move outwardly to its said extended position and for returning said elongated arm to its said retracted position;
first measuring means operable when said first body and said elongated arm are engaged with first opposed well bore surfaces for measuring the lineal distance therebetween;
a second body;
means for coupling said second body to an intermediate portion of said elongated arm to position said second body between said first opposed well bore surfaces when said first body and said elongated arm are engaged therewith;
first and second caliper arms having their inward ends pivotally mounted on the opposite sides of said second body and operatively arranged for pivotal movement in a common plane between retracted positions adjacent to said second body and extended positions where the outward ends of said caliper arms are respectively engaged with second opposed well bore surfaces lying between said first opposed well bore surfaces;
second actuating means arranged on said second body for selectively pivoting said caliper arms back and forth between their said positions and including biasing means urging said outward ends of said caliper arms against their respectively adjacent well bore surfaces with sufficient force to maintain their said outward ends slidably engaged therewith, and a piston actuator for selectively releasing said caliper arms for movement outwardly to their said extended positions and for returning said caliper arms to their said retracted positions; and
second measuring means operable on engagement of said caliper arms with said second opposed well bore surfaces for measuring the lineal distance therebetween.

29. The well tool of claim 28 wherein said elongated arm moves along a plane of movement including the longitudinal well bore axis so that the lineal distance measured by said first measuring means is the well bore diameter lying along said plane of movement of said movable arm.

30. The well tool of claim 28 wherein said common plane of movement for said caliper arms includes the longitudinal well bore axis so that the lineal distance measured by said second measuring means is the well bore diameter lying along said common plane of movement for said caliper arms.

31. The well tool of claim 28 wherein said elongated arm and said caliper arms respectively move along intersecting first and second movement planes including the longitudinal well bore axis so that the lineal distances measured by said first and second measuring means are the well bore diameters lying along each of said movement planes.

32. The well tool of claim 31 wherein said first and second movement planes perpendicularly intersect one another.

33. The well tool of claim 28 further including:
first pivot means for coupling the inward end of said elongated arm on said first body so that said elongated arm swings outwardly in a movement plane including the central axis of said first body and the longitudinal well bore axis and said first measuring means are measuring the well bore diameter lying in said movement plane of said elongated arm.

34. The well tool of claim 33 wherein said means coupling said second body to said elongated arm include second pivot means located precisely between said ends of said elongated arm for aligning the central axis of said second body with the longitudinal well bore axis when said elongated arm is in its said extended position so that said caliper arms swing outwardly in a common movement plane including said central axis of said second body and said longitudinal well bore axis and said second measuring means are measuring the well bore diameter lying in said common movement plane.

35. The well tool of claim 34 wherein said movement planes perpendicularly intersect one another so that said measured well bore diameters are at right angles to one another.

36. A logging tool for passage along a borehole including:
a first body for suspension from a cable in a borehole;
means for decentralizing said tool body in a well bore including an elongated decentralizer arm having inward and outward ends, and first pivot means coupling said inward end of said decentralizer arm to said first body of movement between a retracted position adjacent to one side of said first body and an extended position where the outward end of said decentralizer arm is engaging a borehole wall;

first actuating means on said first body for selectively moving said decentralizer arm between its said positions including first biasing means urging said outward end of said decentralizer arm against a borehole wall to laterally shift said first body and slidably engage its other side with the opposite borehole wall, and first piston means for returning said decentralizer arm to its said retracted position;

first measuring means operable upon engagement of said first body and said movable arm with a first set of opposing borehole walls for measuring the distance therebetween;

a second body;

second pivot means on the center of said decentralizer arm between its said inward and outward ends for coupling said second body to said decentralizer arm and for precisely positioning said second body midway between said first set of opposing borehole walls when said decentralizer is extended;

means for stabilizing said second body including an elongated support arm having inward and outward ends, third pivot means on said first body directly below said first pivot means for coupling said inward end of said support arm to said first body, and fourth pivot means on said second body directly below said second pivot means for coupling said outward end of said support arm to said second body and for providing a parallelogram mechanism having its four corners defined by said first, second, third and fourth pivot means;

a pair of depending caliper arms having their inward ends pivotally mounted on opposite sides of said second body and movable outwardly therefrom for engaging their outward ends with a second set of opposing borehole walls;

second actuating means arranged on said second body for selectively moving said caliper arms between their respective retracted and extended positions and including second biasing means urging their said outward ends against an adjacent wall of a borehole, and second piston means for returning said caliper arms to their said retracted positions;

second measuring means operable upon engagement of said caliper arms with said second opposed well bore surfaces for measuring the lineal distance therebetween.

37. The logging tool of claim 36 further including: means on said first body for measuring a characteristic of earth formations penetrated by a borehole.

38. The well tool of claim 36 wherein said decentralizer arm moves along a plane of movement including the longitudinal borehole axis so that the lineal distance measured by said first measuring means is a borehole diameter lying in said plane of movement of said decentralizer arm.

39. The well tool of claim 36 wherein said caliper arms move along a common plane of movement including the longitudinal well bore axis so that the lineal distance measured by said second measuring means is a borehole diameter lying in said common plane of movement of said caliper arms.

40. The well tool of claim 36 wherein said decentralizer arm and said caliper arms respectively move along first and second movement planes including the longitudinal well bore axis so that the lineal distances measured by said first and second measuring means are borehole diameters respectively lying in each of said movement planes.

41. The well tool of claim 40 wherein said first and second movement planes perpendicularly intersect one another.

42. The logging tool of claim 41 further including: means on said first body for measuring a characteristic of earth formations penetrated by a borehole only when said other side of said first body is slidably engaged with a borehole wall.

* * * * *